Nov. 17, 1942.   R. R. PETERSON   2,302,570
ADJUSTABLE TRACTOR AXLE
Filed Oct. 29, 1941
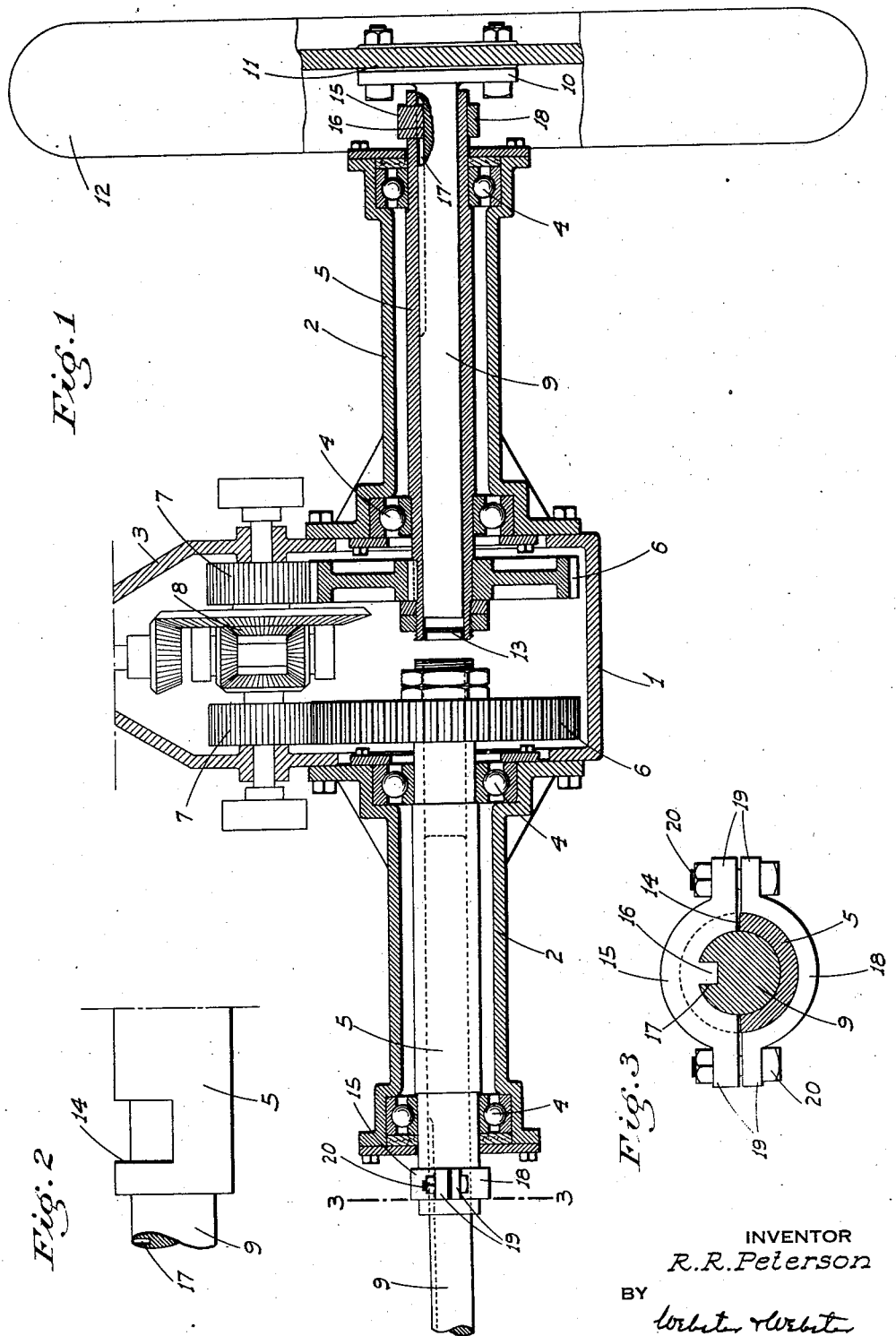
INVENTOR
R.R. Peterson
BY
ATTYS Patented Nov. 17, 1942

2,302,570

UNITED STATES PATENT OFFICE 2,302,570

ADJUSTABLE TRACTOR AXLE

Robert Ralph Peterson, Lindsay, Calif.

Application October 29, 1941, Serial No. 417,005

9 Claims. (Cl. 180—75)

This invention relates to tractors, and particularly to an adjustable-gauge wheel tractor such as is used in connection with row-crop, vineyard, and similar cultivating operations.

Different crops are planted different distances apart, and it is therefore necessary to adjust the tractor wheels so that they are spaced apart different distances according to the spacing of the particular crop being cultivated. In tractors at present used for this purpose, the drive axle is a fixed length for a predetermined maximum wheel spacing, and the wheels are adjustable thereon. When the wheels are relatively close together therefore the axle projects therefrom and is in the way of any tall growth such as grape vines, preventing tractors of this type from being used for vineyard cultivation.

It is therefore the principal object of my invention to eliminate this objectionable feature by providing an adjustable wheel mounting means for a tractor so arranged that the position of the wheels themselves determines the overall width of the tractor, and as the wheels are brought together such overall width is increasingly decreased, thus making the tractor suitable for all cultivating purposes.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a fragmentary sectional plan of my improved wheel mounting structure, showing one wheel set to a narrow gauge and the axle of the other wheel extended to a wide gauge setting.

Figure 2 is a fragmentary detached elevation of a drive sleeve at its outer end and the slidable axle therein.

Figure 3 is an enlarged cross section on the line 3—3 of Fig. 1.

Referring now more particularly to the characters of reference on the drawing, the structure comprises a gear box 1 from the opposite sides of which tubular housings 2 project in rigid relation, the box forming the rear end of the usual transmission housing 3 of the tractor. Turnably mounted in the housings on antifriction bearings 4 and held against axial movement are individual driving sleeves 5. These sleeves project from within the gear box 1 to terminations beyond the outer ends of the housings 2 a short distance. Gears 6 are secured on the sleeves within the gear box, which mesh with pinions 7 connected in driving relation with a conventional differential mechanism 8 in the housing 3, which mechanism is driven from the engine of the tractor in the customary manner.

Slidably fitted in the sleeves 5 are individual axles 9 which project from the outer ends of the sleeves and are provided at their outer end with enlarged flanges 10 bolted to the hubs 11 of reversible wheels 12 of a standard type. When the axles are telescoped within the sleeves as far as possible, they terminate short of the inner end of the sleeves sufficient to enable sealing elements 13 to be placed in the latter to prevent an undesired flow of oil from the gear box into the sleeves and along the axles.

The axles and sleeves are quite long, so that said axles may be extended a considerable distance and still have proper rigid support in the sleeves, and thus enabling the gauge of the wheels to be increased considerably over the minimum.

Various methods may be used to mount the axles in driving relation with the sleeves, and to maintain said axles in any desired fixed position relative to the sleeves. Preferably, however, I employ the following simple arrangement:

Each sleeve 5, where it projects at its outer end beyond the corresponding housing 2, is cut away for half its circumference and for a short axial distance laterally inward from its outer end so as to form a semi-circumferential slot 14. A saddle 15 fits said slot and engages about the adjacent portion of the corresponding axle, said saddle having a key element 16 projecting into a longitudinal keyway 17 formed in the axle. The saddle is clamped in frictional holding engagement with the axle by a cooperating opposed saddle 18 closely engaging about the sleeve opposite the slot, both saddles having flanges 19 along their sides through which clamping bolts are placed.

It will, of course, be understood that the saddle 15 terminates short of the ends of the slot 14 and that the flanges 19 are spaced slightly from each other so that tightening of the bolts will cause the axle to be pressed into frictional engagement with the sleeve and saddle, while the saddle is likewise pressed into frictional engagement with the outer surface of the sleeve. It will thus be seen that the saddle unit forms a combined driving and retaining connection between the sleeve and axle regardless of the advanced or contracted position of the latter relative to the sleeve. The two saddle units being disposed between the supporting housing and the wheels they are in a position where they can be conveniently operated for the adjustment of the wheels.

From the foregoing description it will be readily seen that I have produced such a device as substantially fulfills the objects of the invention as set forth herein.

While this specification sets forth in detail the present and preferred construction of the device, still in practice such deviations from such detail may be restorted to as do not form a departure from the spirit of the invention, as defined by the appended claims.

Having thus described my invention what I claim as new and useful and desire to secure by Letters Patent is:

1. In a tractor having a gear box, sleeves projecting laterally from said box, bearing members fixed in relation to the box and engaging the sleeves adjacent their ends, means to drive the sleeves from within the box, axles slidable within the sleeves and projecting from the outer ends thereof, wheels carried by the axles, the axles being adapted to slide within the sleeves sufficiently to enable the wheels to be disposed close to the outer ends of the sleeves when the axles are fully retracted, means connecting the axles and sleeves in driving relationship and means to releasably clamp the axles and sleeves against relative sliding movement.

2. In a tractor having a gear box, sleeves projecting laterally from said box, bearing members fixed in relation to the box and engaging the sleeves adjacent their ends, means to drive the sleeves from within the box, axles slidable within the sleeves and projecting from the outer ends thereof, wheels carried by the axles, the axles being adapted to slide within the sleeves sufficiently to enable the wheels to be disposed close to the outer ends of the sleeves when the axles are fully retracted, and a unit for each axle and the corresponding sleeve connecting the sleeve and axle in driving relationship and clamping the same against relative sliding movement.

3. In a tractor having a gear box, sleeves projecting laterally from said box, means to drive the sleeves from within the box, axles slidable within the sleeves and projecting from the outer ends thereof, wheels carried by the axles, each axle having a longitudinal keyway, a key slidably fitting the keyway and means to releasably clamp the key in driving relationship with the sleeve and also retaining the axle against sliding movement in the sleeve.

4. In a tractor having a gear box, sleeves projecting laterally from said box, means to drive the sleeves from within the box, axles slidable within the sleeves and projecting from the outer ends thereof, wheels carried by the axles, each axle having a longitudinal keyway, a key slidably fitting the keyway, means non-turnably mounting the key in connection with the sleeve and means to releasably clamp said key mounting means on the axle.

5. In a tractor having a gear box, sleeves projecting laterally from said box, means to drive the sleeves from within the box, axles slidable within the sleeves and projecting from the outer ends thereof, wheels carried by the axles, each axle having a longitudinal keyway, a key slidably fitting the keyway, a member on which the key is mounted, and means to releasably clamp said member in connection with the axle and sleeve.

6. In a tractor having a gear box, sleeves projecting laterally from said box, means to drive the sleeves from within the box, axles slidable within the sleeves and projecting from the outer ends thereof, wheels carried by the axles, each axle having a longitudinal keyway, a key slidably fitting the keyway, an axle-engaging saddle on which the key is mounted, means mounting the saddle against movement axially of the sleeve and means to releasably clamp the saddle on the sleeve and in non-movable relation to the sleeve.

7. In a tractor having a gear box, sleeves projecting laterally from said box, means to drive the sleeves from within the box, axles slidable within the sleeves and projecting from the outer ends thereof, wheels carried by the axles, each axle having a longitudinal keyway, and the sleeve having an exposed arcuate slot exposing a portion of the axle and keyway, a saddle fitting said slot and engaging about said portion of the axle, a key on the saddle projecting into the keyway and means connecting the saddle and sleeve and releasably clamping the saddle on the axle and in driving relationship with the sleeve.

8. A structure as in claim 7, in which said last named means comprises another saddle disposed opposite the first named saddle and engaging about the corresponding portion of the sleeve and means releasably connecting the saddles and pulling the same toward each other.

9. In a tractor having a gear box, housings rigid with and projecting laterally from the box, sleeves turnable in and projecting from the outer ends of the housings, drive means applied to the sleeves from within the box, axles slidable within the sleeves and projecting from the outer ends thereof, wheels on the outer ends of the axles, and a unit for each axle and the corresponding sleeve connecting the same in driving and relatively non-slidable relationship and including a manually operable member engaging the sleeve outwardly of the housing.

ROBERT RALPH PETERSON.